US009666884B2

(12) United States Patent
Lee (10) Patent No.: US 9,666,884 B2
(45) Date of Patent: May 30, 2017

(54) FUEL CELL STACK HAVING IMPROVED HEAT CHANGE BETWEEN INFLOW AIR AND EXHAUSTED COOLANT

(71) Applicant: HYUNDAI MOTOR COMPANY, Seoul (KR)

(72) Inventor: Sung-Ho Lee, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 45 days.

(21) Appl. No.: 14/548,273

(22) Filed: Nov. 19, 2014

(65) Prior Publication Data

US 2015/0188159 A1 Jul. 2, 2015

(30) Foreign Application Priority Data

Dec. 31, 2013 (KR) .................. 10-2013-0168489

(51) Int. Cl.
| | |
|---|---|
| *H01M 8/06* | (2016.01) |
| *H01M 8/04007* | (2016.01) |
| *H01M 8/04089* | (2016.01) |
| *H01M 8/241* | (2016.01) |
| *H01M 8/2465* | (2016.01) |
| *H01M 8/0267* | (2016.01) |
| *H01M 8/1018* | (2016.01) |

(52) U.S. Cl.
CPC ..... *H01M 8/04074* (2013.01); *H01M 8/0267* (2013.01); *H01M 8/04089* (2013.01); *H01M 8/241* (2013.01); *H01M 8/2465* (2013.01); *H01M 2008/1095* (2013.01)

(58) Field of Classification Search
CPC ......... H01M 8/04074; H01M 8/04089; H01M 8/241; H01M 8/0267; H01M 8/2465; H01M 2008/1095; Y02E 60/50
USPC ......................................... 429/408
See application file for complete search history.

(56) References Cited

U.S. PATENT DOCUMENTS

| | | | |
|---|---|---|---|
| 6,942,941 B2 * | 9/2005 | Blunk ................. | H01M 8/0206 29/623.4 |
| 2004/0258973 A1 * | 12/2004 | Grasso ................ | H01M 8/0267 429/414 |
| 2008/0182151 A1 * | 7/2008 | Mizusaki ............ | H01M 8/0247 429/457 |
| 2008/0274388 A1 | 11/2008 | Kotani et al. | |
| 2010/0040924 A1 * | 2/2010 | Niroumand ......... | H01M 8/0267 429/450 |

FOREIGN PATENT DOCUMENTS

| | | |
|---|---|---|
| JP | 4989089 B2 | 8/2012 |
| KR | 10-2007-0005999 A | 1/2007 |
| KR | 10-1107081 B1 | 1/2012 |

* cited by examiner

*Primary Examiner* — Gary Harris
(74) *Attorney, Agent, or Firm* — McDermott Will & Emery LLP (57) ABSTRACT

A fuel cell stack includes a membrane electrode assembly including an polymer electrolyte membrane, an anode, and a cathode. A separating plate is disposed at two sides of the membrane electrode assembly and includes a coolant path, an air path, and a fuel path. A coolant outlet manifold communicating with the coolant path is formed in the separating plate, and an air inlet manifold communicating with the air path is formed adjacent to the coolant outlet manifold. At least one cooling fin for heat transfer is formed in the coolant outlet manifold and the air inlet manifold.

10 Claims, 6 Drawing Sheets

FIG. 1

- Prior Art -

FUEL CELL STACK HAVING IMPROVED HEAT CHANGE BETWEEN INFLOW AIR AND EXHAUSTED COOLANT

CROSS-REFERENCE TO RELATED APPLICATION

This application claims the benefit of priority to Korean Patent Application No. 10-2013-0168489 filed in the Korean Intellectual Property Office on Dec. 31, 2013, the entire contents of which are incorporated herein by reference.

TECHNICAL FIELD

The present disclosure relates to a fuel cell stack. More particularly, the present disclosure relates to fuel cell stack with improved system efficiency by heat exchange between a coolant outlet manifold and an air inlet manifold.

BACKGROUND

As is generally known, a fuel cell system is a power generation system that directly converts chemical energy of a fuel to electrical energy.

The fuel cell system includes a fuel cell stack generating electrical energy. A fuel supply apparatus supplies fuel (hydrogen) to the fuel cell stack. An air supply apparatus supplies oxygen in the air to the fuel cell stack. A heat and water management apparatus disperses reaction heat of the fuel cell stack to the outside and controls the driving temperature of the fuel cell stack.

The fuel cell system generates electrical power by an electrochemical reaction and exhausts heat and water that are by-products of the electrochemical reaction.

Figure 1:
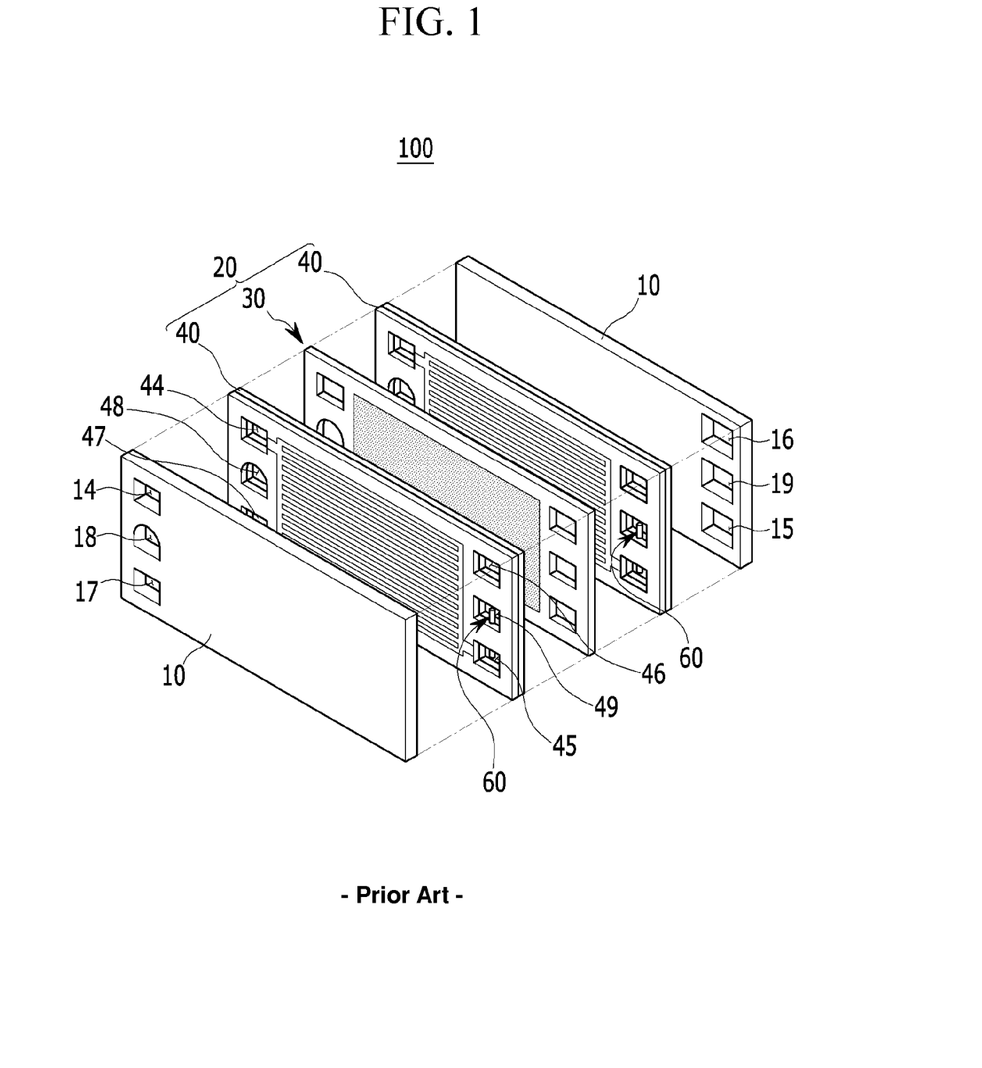
FIG. 1 is an exploded perspective view illustrating a fuel cell stack according to the prior art.

FIG. 1 is an exploded perspective view illustrating a fuel cell stack according to the prior art. For convenience, one unit cell is shown in FIG. 1.

As shown in FIG. 1, the fuel cell stack applied to a fuel cell vehicle has a configuration in which unit cells are continuously disposed. The general fuel cell stack has a configuration in which a plurality of unit cells 20 are stacked between a pair of end plates 10.

Each unit cell 20 includes a membrane electrode assembly (MEA) 30, and two separating plates 40 disposed at respective sides of the MEA 30.

The MEA 30 includes a polymer electrolyte membrane to move protons, and a catalyst layer provided at respective sides of the polymer electrolyte membrane, so that hydrogen and oxygen can react, that is, an anode and a cathode at respective sides of the polymer electrolyte membrane.

A separating plate 40 with flow fields through which reaction hydrogen and oxygen are supplied to the anode and the cathode and water generated by the reaction is exhausted is disposed at the outside of the MEA.

One side of the separating plate 40 faces the cathode or the anode, the other side of the separating plate 40 faces the separating plate 40 of another unit cell 20. A fuel path is formed at one side of the separating plate 40 facing the anode, and an air path is formed at the other side of the separating plate 140 facing the cathode. A coolant path for circulating coolant is formed inside the separating plate 40.

A fuel inlet manifold 44 and a fuel manifold 45 communicating with the fuel path are formed at respective ends of the separating plate 40. An air inlet manifold 46 and an air outlet manifold 47 communicating with the air path are formed at respective ends of the separating plate 40. A coolant inlet manifold 48 and a coolant outlet manifold 49 communicating with the coolant path are formed at respective ends of the separating plate 40.

Moisture is generated in the cathode by an electrochemical reaction of the fuel cell stack, and some moisture generated from the cathode is diffused to the anode. When excessive moisture remains in a path supplying fuel gas, water is generated and a flooding phenomenon in which a large amount of condensed water remains occurs. When the air supplied to the fuel cell stack is blocked by water, performance and durability of the fuel cell is deteriorated, and power generating performance is decreased.

Hydrogen and oxygen are ionized by the chemical reaction of each catalyst layer, thus generating an oxidation reaction generating electrons at a hydrogen portion and a reduction reaction generating water at an oxygen portion.

It is known that the oxidization-reduction reaction occurring in the catalyst layer is most efficient within a range of 60-80 degrees Celsius. However, temperature of the air that flows through the air inflow manifold is relatively low, thus efficiency of the oxidization-reduction reaction is decreased.

That is, in order to improve efficient driving of the fuel cell stack, the temperature of the air that flows through the air inlet manifold 46 should be high, and an exhausted coolant through the separating plate 40 should be rapidly cooled.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a fuel cell stack in which heat is efficiently exchanged between inflow air and exhausted coolant.

Further, the present disclosure has been made in an effort to provide a fuel cell stack that can improve efficiency of an oxidation-reduction reaction occurring inside of the fuel cell stack by increasing temperature of inflow air.

A fuel cell stack according to an exemplary embodiment of the present disclosure includes a membrane electrode assembly including a polymer electrolyte membrane, an anode, and a cathode. A separating plate is disposed at two sides of the membrane electrode assembly and forms a coolant path, an air path, and a fuel path. A coolant outlet manifold is formed in the separating plate communicating with the coolant path. An air inlet manifold communicating with the air path is formed adjacent to the coolant outlet manifold, and at least one cooling fin for heat transfer is formed in the coolant outlet manifold and the air inlet manifold.

A fuel manifold may be formed adjacent to the coolant outlet manifold and communicating with the fuel path, and at least one cooling fin for heat transfer may be formed in the fuel manifold.

A boundary portion between the coolant outlet manifold and the air inlet manifold may be formed with a shape of protrusions and depressions.

A boundary portion between the coolant outlet manifold and the fuel manifold may be formed with a shape of protrusions and depressions.

A fuel inlet manifold communicating with the fuel path may be formed adjacent to the coolant outlet manifold, and at least one cooling fin for heat transfer may be formed in the fuel inlet manifold.

A boundary portion between the coolant outlet manifold and the fuel inlet manifold may be formed with a shape of protrusions and depressions.

According to the present disclosure, heat is efficiently exchanged between an air inlet manifold and a coolant outlet manifold by providing a cooling fin in the air inlet manifold and the coolant outlet manifold.

Further, according to the present disclosure, temperature of inflow air is increased by efficient heat exchange between an air inlet manifold and a coolant outlet manifold, so that performance of a fuel cell is improved.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

A fuel cell system according to the exemplary embodiment of the present disclosure is provided in a fuel cell vehicle. The fuel cell system includes an electricity generating system generating electrical energy by an electrochemical reaction between a fuel and an oxidizer which are reaction sources.

When the fuel cell system is configured with a direct oxidation fuel cell, the fuel may include an alcoholic liquid fuel such as methanol and ethanol. The fuel may include a liquefied gas fuel of a hydrocarbon-group material including methane, ethane, propane, and butane.

When the fuel cell system is configured with a polymer electrolyte membrane fuel cell, the fuel may include a reformed gas such as hydrogen generated from the liquid fuel or the liquefied gas fuel. The reformed gas may be generated with a reformer.

For convenience, the fuel will now be referred to as hydrogen in the specification.

Further, the oxidizer may be oxygen gas stored in an additional storage tank, or natural air. For convenience, the oxidizer will now be referred to as air.

Figure 2:
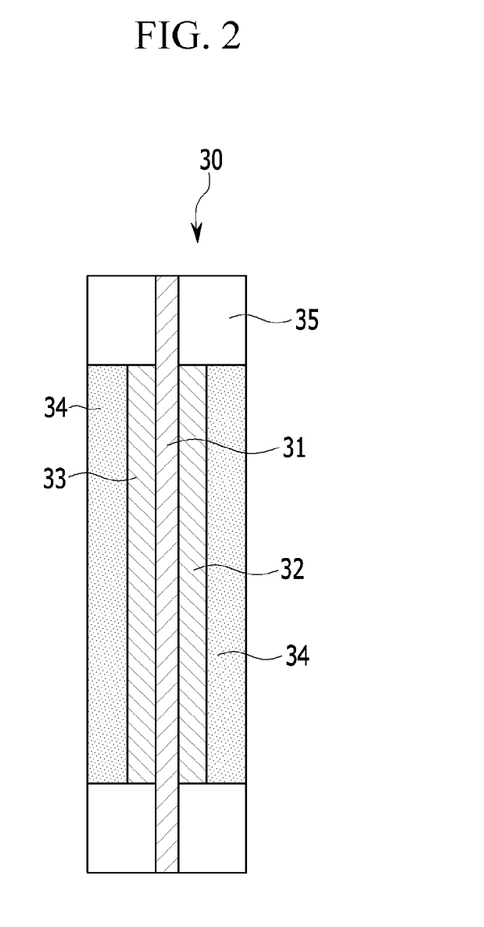
FIG. 2 is an exploded perspective view illustrating a fuel cell stack according to an exemplary embodiment of the present disclosure.
Figure 3:
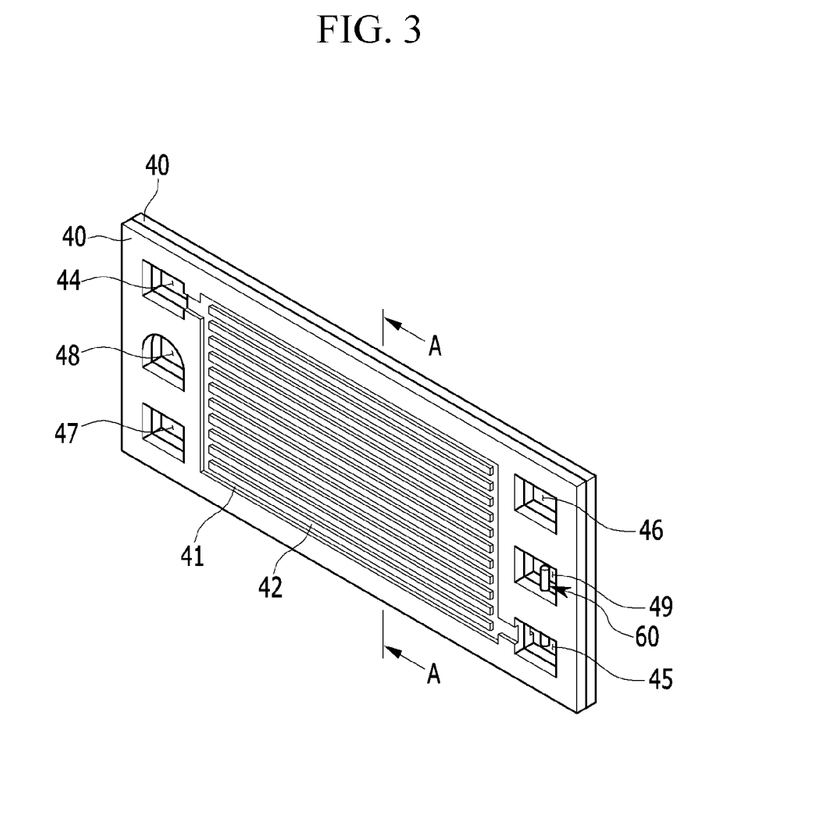
FIG. 3 is a perspective view illustrating a separating plate of a fuel cell stack according to an exemplary embodiment of the present disclosure.
Figure 4:
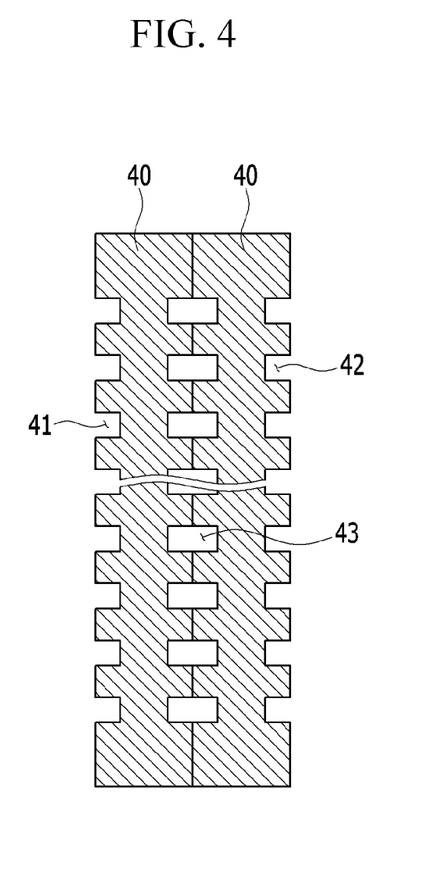
FIG. 4 is a cross-sectional view of FIG. 3 taken along the line A-A.

FIG. 2 is an exploded perspective view illustrating a fuel cell stack according to an exemplary embodiment of the present disclosure. FIG. 3 is a perspective view illustrating a separating plate of a fuel cell stack according to an exemplary embodiment of the present disclosure. FIG. 4 is a cross-sectional view of FIG. 3 taken along the line A-A. For convenience, one unit cell is shown in FIG. 2.

As shown in FIGS. 2 to 4, a fuel cell stack 100 according to an exemplary embodiment of the present disclosure includes a pair of end plates 10 and a plurality of unit cells 20 disposed between the pair of end plates 10 (same reference numerals are used as in FIG. 1). The pair of end plates 10 and the plurality of unit cells 20 are engaged while a predetermined pressure is applied thereto, such that the pair of end plates 10 and the plurality of unit cells 20 are closely attached.

Each unit cell 20 includes a membrane electrode assembly (MEA) 30 and two separating plates 40 provided at two sides of the membrane electrode assembly 30. The MEA 30 includes a polymer electrolyte membrane 31 to move protons. One of catalyst layers, which is an anode 32, is disposed at one side of the polymer electrolyte membrane 31, and another catalyst layer, which is a cathode 33, is disposed at the opposite side of the polymer electrolyte membrane 31 so that hydrogen and oxygen can react.

A gas diffusion layer (GDL) 34 is disposed at two sides of the membrane electrode assembly 30. A gasket 35 is provided at an upper side of the GDL 34. A separating plate 40 with flow fields through which reaction hydrogen and oxygen are supplied to the anode 32 and the cathode 33 and water generated by the reaction is exhausted, is disposed at the outside of the GDL.

One side of the separating plate 40 faces the anode 32 or the cathode 33, and the opposite side of the separating plate 40 faces the separating plate 40 of another unit cell 20. The flow fields include a fuel path 41 formed at one side of the separating plate 40 facing the anode 32, and an air path 42 formed at the opposite side of the separating plate 40 facing the cathode 33. A coolant path 43 for circulating coolant is formed inside of the separating plate 40.

A fuel inlet manifold 44 is formed in a left upper portion of the separating plate 40, and a fuel manifold 45 is formed in a left lower portion of the separating plate 40. The fuel inlet manifold 44 communicates with the fuel manifold 45 through the fuel path 41.

An air inlet manifold 46 is formed in a right upper portion of the separating plate 40, and an air outlet manifold 47 is formed in a left lower portion of the separating plate 40. The air inlet manifold 46 communicates with the air outlet manifold 47 through the air path 42.

A coolant inlet manifold 48 is formed in a left center portion of the separating plate 40, and a coolant outlet manifold 49 is formed in a right center portion of the separating plate 40. The coolant inlet manifold 48 communicates with the coolant outlet manifold 49 through the coolant path 43. That is, the air inlet manifold 46 is formed in an upper portion of the coolant outlet manifold 49, and the fuel manifold 45 is formed in a lower portion of the coolant outlet manifold 49.

A fuel inlet manifold 14 is formed in one of the pair of end plates 10 (see FIG. 1), at a position corresponding to the fuel inlet manifold 44 of the separating plate 40. A coolant inlet manifold 18 is formed in a position corresponding to the coolant inlet manifold 48 of the separating plate 40. An air outlet manifold 17 is formed in a position corresponding to the air outlet manifold 47 of the separating plate 40.

An air inlet manifold 16 is formed in the other end plate 10, at a position corresponding to the air inlet manifold 46 of the separating plate 40. A coolant outlet manifold 19 is formed in a position corresponding to the coolant outlet manifold 49 of the separating plate 40. A fuel manifold 15 is formed in a position corresponding to the fuel manifold 45 of the separating plate 40.

The manifolds 44-49 of the separating plate 40 communicate with the manifolds 14-19 of the end plate 10.

Fuel flowed into the fuel inlet manifold 14 of the end plate 10 flows to the fuel inlet manifold 44 of the separating plate 40. Then the fuel is supplied to the anode 32 through the fuel path 41 of the separating plate 40, and unreacted fuel in the anode 32 is exhausted through the fuel manifolds 45 and 15.

Air flowed into the air inlet manifold 16 of the end plate 10 flows to the air inlet manifold 46 of the separating plate 40. Then, the air is supplied to the cathode 33 of the air path 42 of the separating plate 40, and unreacted air in the cathode 33 is exhausted through the air outlet manifolds 47 and 17.

Coolant flowed into the coolant inlet manifold 18 of the end plate 10 flows to the coolant inlet manifold 48 of the separating plate 40. Coolant flows through the coolant path 43 of the separating plate 40 and cools the unit cell 20.

FIGS. 5(a)-5(e) are partially cut-away views illustrating a separating plate according to an exemplary embodiment of the present disclosure. FIG. 6 is a partially cut-away view illustrating a separating plate according to another exemplary embodiment of the present disclosure.

Figure 5:
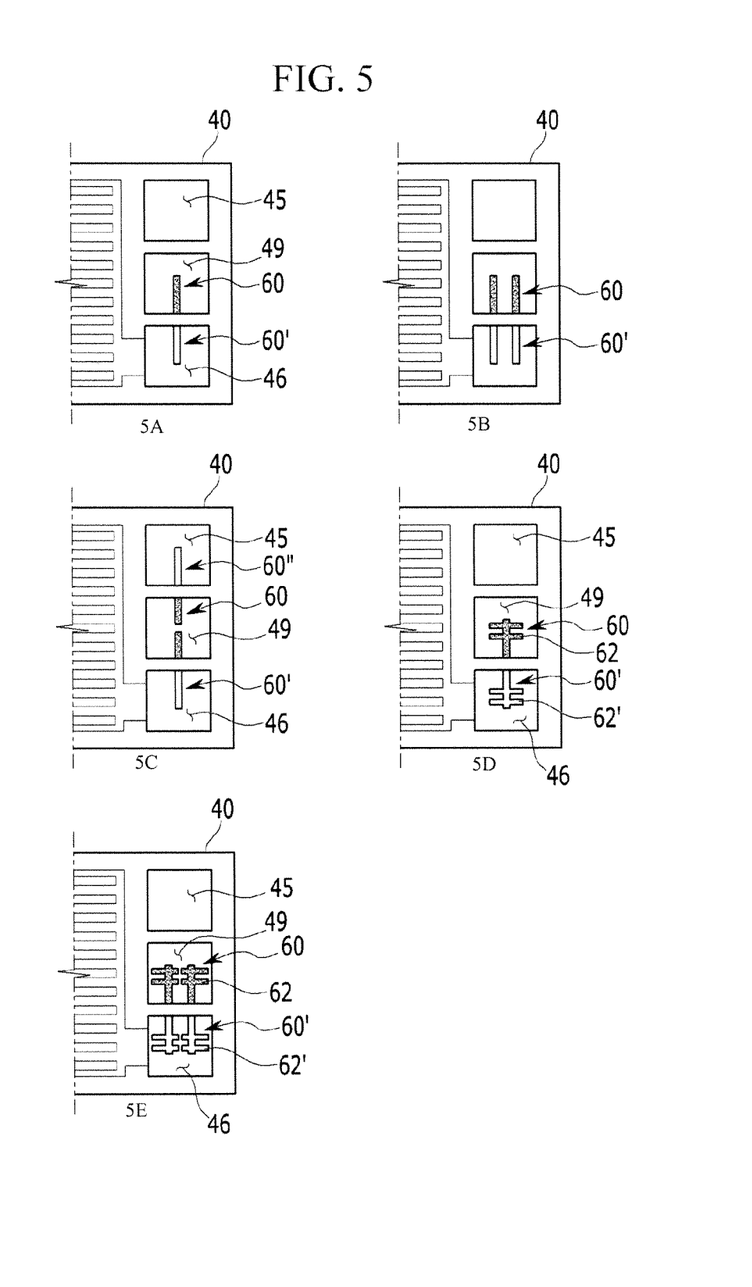
FIGS. 5A and 5E are partially cut-away views illustrating a separating plate according to an exemplary embodiment of the present disclosure.
Figure 6:
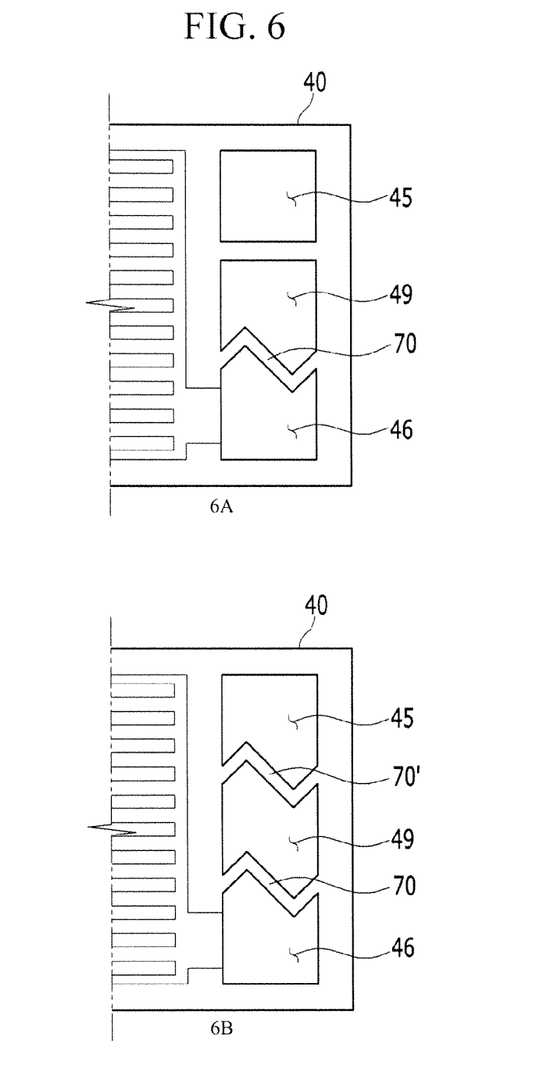
FIGS. 6A and 6B are partially cut-away views illustrating a separating plate according to another exemplary embodiment of the present disclosure.

As shown in FIG. 5 (a), a first cooling fin 60 is formed in the coolant outlet manifold 49, and a second cooling fin 60' is formed in the air inlet manifold 46. The first cooling fin 60 and the second cooling fin 60' may be formed in plural (refer to FIG. 5 (b) and (e)).

Since the cooling fins 60 and 60' are provided in the coolant outlet manifold 49 and the air inlet manifold 46, respectively, heat is efficiently exchanged between the coolant with a relatively high temperature and air from the outside with a relatively low temperature.

Generally, in order to improve efficiency of an oxidation-reduction reaction occurring in a catalyst layer, high temperature air needs to flow into the catalyst layer. However, the temperature of the air flowing into the catalyst layer through the air inlet manifold is relatively low. Therefore, it is beneficial in terms of efficiency of the fuel cell to increase the temperature of air flowing into the catalyst.

Since coolant exhausted through the coolant outlet manifold 49 is exhausted after cooling the unit cell 20, the temperature of the coolant is relatively high. When heat is exchanged between the coolant exhausted through the coolant outlet manifold 49 and air flowing through the air inlet manifold 46, it is possible to increase the temperature of the air flowing into the catalyst layer through the air inlet manifold 46. Therefore, efficiency of the oxidation-reduction reaction occurring in the catalyst layer and performance of the fuel cell are improved.

Generally, the separating plate 40 is made of stainless steel. However, the first cooling fin 60 may be made of copper having high heat conductivity compared to the separating plate 40 made of stainless steel in order to increase heat exchange efficiency.

The first cooling fin 60 may be formed in plural in order to increase the heat exchange efficiency between the coolant outlet manifold 49 and the air inlet manifold 46 (refer to FIG. 5 (b)).

Further, a third cooling fin 60" may be formed in the fuel manifold 45 adjacent to the coolant outlet manifold 49 in order to increase the heat exchange (refer to FIG. 5 (c)).

Since the temperature of the coolant exhausted from the coolant outlet manifold 49 is highest in a center portion of the coolant outlet manifold 49, a cooling protrusion 62, 62' is formed in the cooling fin 60 in order to increase the heat exchange efficiency (refer to FIG. 5 (d) and FIG. 5 (e)).

As such, the cooling fins 60, 60' having the cooling protrusions 62, 62' are provided in the coolant outlet manifold 49 and the air inlet manifold 46, respectively, thereby the increasing heat exchange efficiency between exhausted coolant and inflow air.

FIGS. 6(a) and 6(b) are partially cut-away views illustrating a separating plate according to another exemplary embodiment of the present invention.

As shown in FIGS. 6(a) and 6(b), a boundary portion 70 dividing the coolant outlet manifold 49 and the air inlet manifold 46 may be formed in a shape of protrusions and depressions.

Since the boundary portion 70 is formed in a shape of protrusions and depressions, a heat exchange area between the coolant outlet manifold 49 and the air inlet manifold 46 is maximized. Therefore, heat is smoothly exchanged between exhausted coolant and inflow air, and then the temperature of air flowing into the catalyst layer is increased.

Further, a boundary portion 70' dividing the coolant outlet manifold 49 and the fuel manifold 45 may be formed in a shape of protrusions and depressions. Thereby, a heat exchange area between the coolant outlet manifold 49 and the fuel manifold 45 is maximized.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A fuel cell stack comprising:
   a membrane electrode assembly comprising a polymer electrolyte membrane, an anode, and a cathode; and
   a separating plate disposed at two sides of the membrane electrode assembly, and the separating plate having a coolant path, an air path, and a fuel path,
   wherein a coolant outlet manifold fluidly communicating with the coolant path is formed in the separating plate,
   an air inlet manifold communicating with the air path is formed adjacent to the coolant outlet manifold, and
   at least one cooling fin for heat transfer is formed in the coolant outlet manifold and the air inlet manifold such that the at least one cooling fin extends vertically within an inner space of the coolant outlet manifold and the air inlet manifold.

2. The fuel cell stack of claim 1,
   wherein a fuel manifold is formed adjacent to the coolant outlet manifold and communicates with the fuel path, and
   at least one cooling fin for heat transfer is formed in the fuel manifold.

3. The fuel cell stack of claim 2,
wherein a boundary portion between the coolant outlet manifold and the air inlet manifold is formed with a shape of protrusions and depressions.

4. The fuel cell stack of claim 2,
wherein a boundary portion between the coolant outlet manifold and the fuel manifold is formed with a shape of protrusions and depressions.

5. The fuel cell stack of claim 1,
wherein at least one cooling protrusion for heat transfer is formed in the at least one cooling fin.

6. The fuel cell stack of claim 1, further comprising:
a pair of end plates; and
a plurality of unit cells disposed between the pair of end plates.

7. The fuel cell stack of claim 1,
wherein the membrane electrode assembly further comprises a gas diffusion layer (GDL) and a gasket.

8. The fuel cell stack of claim 2,
wherein an air outlet manifold communicating with the air inlet manifold through the air path is formed in a lower portion at one side of the separating plate,
a coolant inlet manifold communicating with the coolant outlet manifold through the coolant path is formed in a center portion at the one side of the separating plate, and
a fuel inlet manifold communicating with the fuel manifold through the fuel path is formed in an upper portion at the one side of the separating plate.

9. The fuel cell stack of claim 1, wherein the anode is disposed at one side of the polymer electrolyte membrane and cathode is disposed at the opposite side of the polymer electrolyte membrane.

10. The fuel cell stack of claim 1, wherein the at least one cooling fin includes a first cooling fin disposed in the coolant outlet manifold and extending upward, and a second cooling fin disposed in the air inlet manifold and extending downward.

* * * * *